United States Patent [19]
Latakas et al.

[11] 4,105,423
[45] Aug. 8, 1978

[54] COMPACT AIR FILTER WITH TUBULAR FRAME

[75] Inventors: Bernard Latakas, Rosann, Ind.; John E. Copenhefer, Louisville, Ky.; Robert M. House, Wabash, Ind.

[73] Assignee: United States Gypsum Company, Chicago, Ill.

[21] Appl. No.: 792,834

[22] Filed: May 2, 1977

Related U.S. Application Data

[63] Continuation of Ser. No. 636,388, Dec. 1, 1975, abandoned.

[51] Int. Cl.² ............................................. B01D 46/10
[52] U.S. Cl. .............................. 55/501; 55/DIG. 31
[58] Field of Search ............... 55/485, 486, 487, 490, 55/491, 492–495, 501, 509, 511, 513, 515, 518, 519, 527–529, DIG. 16, DIG. 31; 229/30, 32, 34 HW, DIG. 4

[56] References Cited

U.S. PATENT DOCUMENTS

| 1,787,498 | 1/1931 | Tinsley .................... 229/34 HW |
| 2,080,726 | 5/1937 | Lowinger ...................... 55/511 |
| 2,116,513 | 7/1939 | Frankenstein ............... 229/34 HW |
| 2,754,928 | 7/1956 | Hambrecht et al. ......... 55/DIG. 31 |
| 2,965,197 | 12/1960 | Dow et al. ........................ 55/511 |
| 2,973,831 | 3/1961 | Sprouse et al. ............. 55/DIG. 31 |
| 3,102,014 | 8/1963 | Aitkenhead ................ 55/DIG. 16 |
| 3,830,045 | 8/1974 | Copenhefer ..................... 55/511 |
| 3,938,973 | 2/1976 | Kershaw ......................... 55/511 |
| 3,970,440 | 7/1976 | Copenhefer et al. ........ 55/DIG. 31 |

FOREIGN PATENT DOCUMENTS 1,065,519 4/1967 United Kingdom ............. 229/34 HW Primary Examiner—Frank W. Lutter
Assistant Examiner—David L. Lacey
Attorney, Agent, or Firm—Samuel Kurlandsky; Robert H. Robinson; Kenneth E. Roberts

[57] ABSTRACT

A compact nestable air filter of generally rectangular form comprising a frame formed of an integral suitable cut and scored blank of paperboard, which, when assembled, comprises planar frame members engaging a substantially sheet-form filter element therebetween, and having flared frame members disposed at an angle of less than 180° permitting a plurality of completed filters to nest within each other, thereby reducing the bulk of the plurality of filters. The end portions of the flared frame members may be connected together by several means, including glue flaps hingedly connected to one frame member and adhesively affixed to an adjacent member. In an improved embodiment the planar frame members on the bottom or downstream side of the filter are provided with an integral perforated cover sheet for retaining the filter element in place when subjected to an air current. The flared frame members are provided with edge panels interconnecting the upper and lower panels forming the frame members. As a result the flared frame members have a tubular contour, greatly increasing their strength and rigidity.

9 Claims, 8 Drawing Figures

COMPACT AIR FILTER WITH TUBULAR FRAME

This is a Continuation of application Ser. No. 636,388, filed Dec. 1, 1975, now abandoned.

BACKGROUND OF THE INVENTION (1) Field of the Invention

The present invention relates to disposable air filters, and is more particularly concerned with an air filter which is compact and which may be inexpensively fabricated of readily available materials.

(2) Prior Art

Fibrous glass air filter units have met outstanding commercial success for a long period of time. Such filters are constructed of a filter element formed of glass fibers coated with a sticky substance for holding particles impinging against the fibers in adherence thereto. Because of their high efficiency, reasonable cost, and inertness to corrosive agents, such filters rapidly have established an important position in domestic forced air heating and air conditioning installations. This success has been attributed to the attractive, simple and economical form in which the units have been produced as well as to the excellent and aggressive sales promotion of the products.

The design of the air filter has remained substantially unchanged since its early introduction. Such structure comprises the filter element formed of a core of glass fibers bound together by small particles of a resinous binder and coated with a thin transparent film of a viscous non-volatile oil, to retain airborne particles impelled against the fibers by the air movement. The filter element is retained between two closely perforated sheets of tin plate metal commonly known and available as bottle cap scrap. The filter and the pair of perforated confining tin plate sheets are held together within an inwardly facing U-channel of a hollow frame of sturdy but inexpensive fiberboard, often decorated and reinforced by an overlay of imprinted paper tape. The structure may be held together with a hot melt adhesive or with staples and a tape with adhesive back.

The bottle cap scrap is a unique adjunct of these air filters and appears in part to account for a portion of the commercial success and sales appeal of the product. The scrap is perforated stock obtained from bottle cap plants where the stock is punched with circular orifices placed as closely together as possible, the area of the circular orifices thereby accounting for nearly 90% of the total area of the stock. With the advent of newer caps for the bottling industry, such as screw-on caps formed of aluminum, and with the advent of container cans for beverages, bottle cap scrap is becoming scarce and is at a premium.

Air filter units have been characterized over the years in being virtually unchanged in their shape and structure. The air filter units are generally in a rectangular form commonly available in thicknesses of ½ to 2 inches, and with varying dimensions to provide filtering areas between ½ and 4 square feet. Because of the inwardly facing U-channel frame of the filtering unit, it is not compact nor can it be compressed or nested in packaging, and thus poses a serious bulk problem. Even though the packaged units may be lightweight, such lightweight bulky packages pose a serious problem where shipping costs are based on volume as well as weight.

Recently, more compact units have appeared as shown in U.S. Pat. Nos. 2,965,197; 3,467,257; and 3,023,839. However, such units have not been entirely satisfactory because of extra strength reinforcement requirements necessitated by the elimination of the bottle cap scrap facing entirely. The need for complex or exotic structural reinforcement arrangements has mitigated against acceptance of these filter units by both the air filter units manufacturer and the consuming public. In addition, as to the consumer, these units just do not have the appeal of the air filter unit with which the consumer is familiar. In U.S. Pat. No. 3,830,045 an improved air filter is disclosed and claimed wherein the frame of the filter is so designed that a plurality of filters may be nested within one another. Moreover, the filter is so designed that only a single bottle cap scrap sheet need be used. However, it would be desirable to dispense entirely with the need for bottle cap scrap as a backing cover for a filter. Moreover, the frame of the structure in question is formed of a plurality of frame members which must be glued together to form the entire frame, and the strength and rigidity of the frame structure should desirably be greater.

SUMMARY OF THE INVENTION

It is therefore an object of the invention to provide a fibrous glass air filter which is compact and which may be stacked to fit in a package under compression so that a stack of filters will have a volume less than ⅓ that of the regular volume for filters of similar size.

It is another object to provide an air filter having a frame which is sufficiently strong and rigid so that complex and unusual reinforcing means need not be used to enable the filter to withstand the sometimes substantial air pressures exerted against the filter by influent air.

It is an additional object of the invention to provide an air filter frame which is simpler in assembly than that of air filter frames disclosed in the art.

It is another object to provide an air filter frame which may dispense entirely with the need for a backing formed of bottle cap scrap.

It is another object to provide an air filter which is readily disposed of by incineration leaving only a small cinder of glass for disposal.

Still other objects and advantages will readily present themselves to one skilled in the art upon reference to the following specification, the drawings, and the claims.

According to the invention an air filter is provided having a frame formed of an integral blank of paperboard or similar inexpensive material suitably cut and scored. The frame is so designed that a portion is planar and engages a filter element. Another portion of the frame is flared and formed of flared flange members both of which are disposed on the same side as and at angles less than 180° with respect to the planar portion of the filter and is connected together by flaps integrally provided. Further, an edge panel is provided connected at its edges to the flared flange members to which converge toward each other in a direction away from the edge panel to render the flared flange members tubular in cross-section a triangular or trapezoidal shape, thereby rendering the flared portion of the frame stronger and more rigid. Additionally, in an improved embodiment, an integral perforated backing is formed integral with the bottom coplanar flange members, thereby entirely obviating the need for the use of bottle cap scrap as a backing.

DESCRIPTION OF THE PREFERRED EMBODIMENTS

Figure 1:
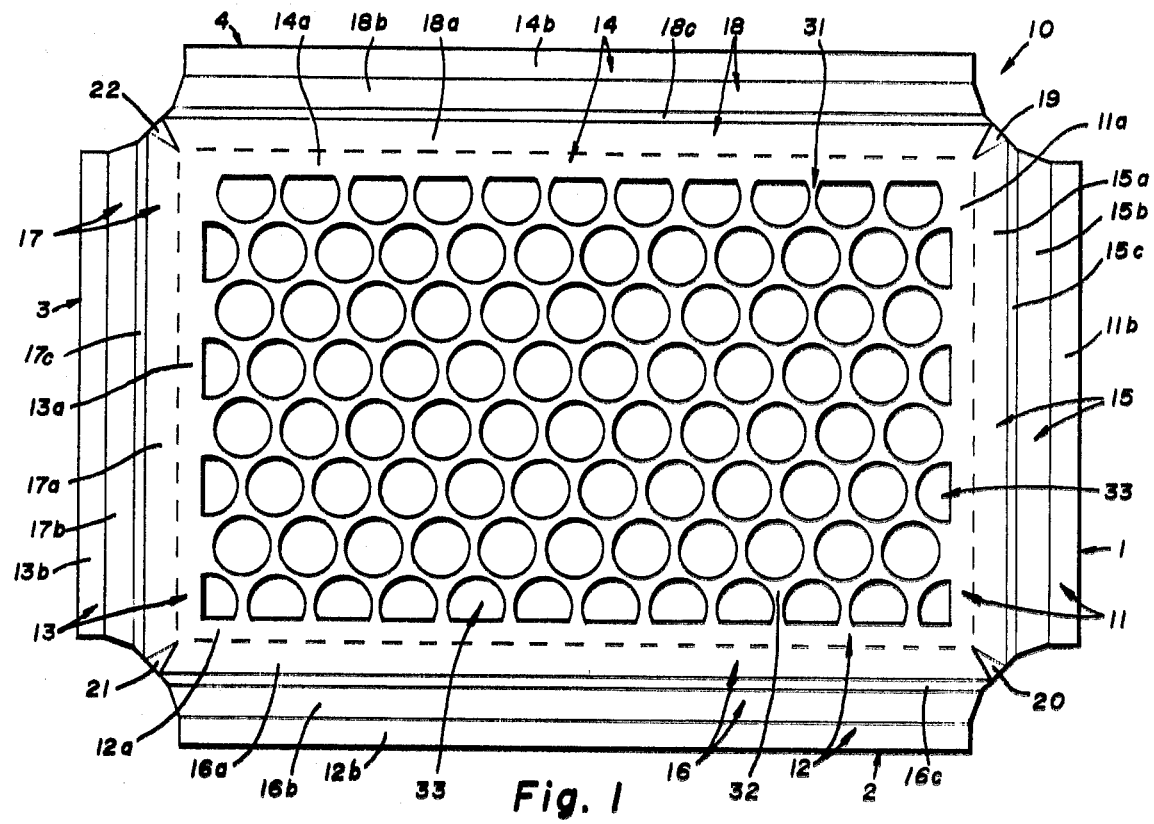
FIG. 1 is a plan view of a cut and scored integral blank formed of paperboard, which may be folded and assembled to form an air filter frame.
Figure 2:
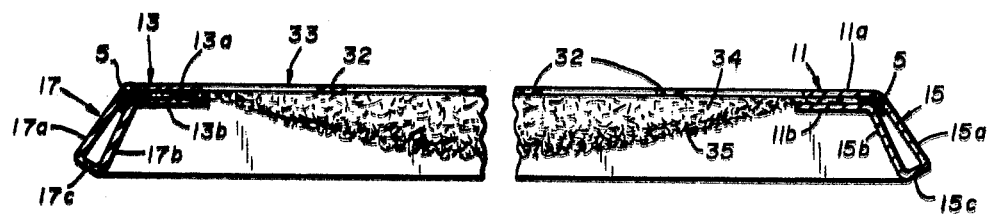
FIG. 2 is a cross-sectional view of a completed filter.
Figure 3:
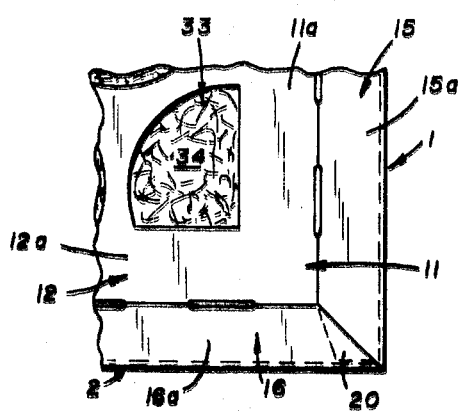
FIG. 3 is a fragmentary plan view illustrating one method of securing a corner of the frame.

Referring to FIGS. 1-3, an air filter according to the invention is shown, having a frame formed of an integral blank 10, shown particularly in FIG 1, comprised of frame members 1, 2, 3, and 4. The frame members 1–4 are formed of coplanar flanges 11, 12, 13 and 14, and flared flange 15, 16, 17 and 18 connected and disposed at an angle less than 180° thereto. The coplanar flanges 11–14 are formed of bottom coplanar flange members 11a, 12a, 13a and 14a, and top coplanar flange members 11b, 12b, 13b and 14b, respectively. The flared flanges 15–18, are formed of bottom flared flange members 15a, 16a, 17a and 18a, and top flared flange members 15b, 16b, 17b and 18b, respectively. According to the invention, edge panels 15c, 16c, 17c and 18c respectively are disposed between the edges of the bottom and top flared flange members and are hingedly connected thereto, thereby cooperating to provide the flared flanges with a tubular form. As seen in FIG. 1, the bottom coplanar flange members 11a–14a are integrally connected together at their ends. The bottom flared flange members 15a–18a are hingedly connected along their edges to the edges of the bottom coplanar flange members 11a–14a, respectively. The edge panels 15c–18c are hingedly connected along one of their edges to the bottom flared flange members 15a–18a and are hingedly connected at their other edges to the top flared flange members 15b–18b. The top coplanar flange members 11b–14b are hingedly connected along their edges to the other edges of the top flared flange members 15b–18b, respectively. Tabs 19, 20, 21 and 22 are hingedly connected to the bottom flared flange members 15a–18a, respectively. Alternatively, they may be connected to the top flared flange members 15b–18b, respectively. A backing member 31 is formed integral with the bottom coplanar flange members 11a–14a, and comprises a web 32 having apertures 33.

In assembling the filter of FIGS. 1-3, a filter element 34 of random layering of very thin highly resilient glass fibers is placed over the bottom coplanar flange members 11a–14a, and may be affixed thereto either adhesively or mechanically. The frame members are then folded over until the top coplanar flange members 11b–14b are superposed over the bottom coplanar members 11a–14a with the filter element 34 interposed therebetween. The top coplanar flange member may be affixed to the filter element and to the bottom coplanar flange members at this point, but may advantageously be adhesively affixed after the flared flanges are affixed in place. The flared flanges 15–18 are then placed in position and their ends affixed to adjacent flared flanges by means of tabs 19, 20, 21 and 22 which are hingedly connected to the bottom flared flange members 15a–18a, and are adhesively affixed to the adjacent flared flanges.

As shown in FIG. 3, the tabs 19–22 are interposed between the bottom flared flange members 15a–18a and top flared flange members 15b–18b and adhesively affixed therebetween. Alternatively they may be adhesively affixed to the outer surfaces of the bottom flared flange members 15a–18a or top flared flange members 15b–18b. The flared flanges 15–18 are all now disposed at an angle less than 180° and preferably about 106° with respect to the coplanar flanges 11–14. If this hasn't already been accomplished above, the top coplanar flange members 11b–14b may now be adhesively affixed to the bottom coplanar flange members 11a–14a and the filter element 34 by means of a hot melt adhesive 5 or any other suitable adhesive or other attachment method such as staples. The resulting structure is shown in FIGS. 2 and 3. In which the bottom flared flange members 15a–18a, and the top flared flange members 15b–18b, respectively, converge toward each other in a direction away from the edge panels 15c–18c, respectively, and with the converged edges of each pair of respective top and bottom flared flange members fixed with respect to each other to form a tubular flared flange of triangular or trapezoidal cross-section having excellent rigidity. If desired, a scrim, not shown, formed of spaced-apart resilient plastic filaments may be mounted over the exposed surface of the filter element 34 and affixed between the filter element and the top coplanar flange members 11b–14b. Alternatively, as shown in FIG. 2, the filter element 34 may be provided with a denser layer 35 at the outer surface in order to provide support for the exposed top surface which is not reinforced by the backing member 31.

Figure 4:
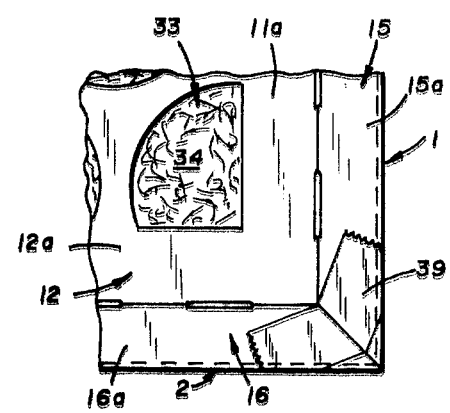
FIG. 4 is a fragmentary plan view of a filter illustrating a structure and method of securing a corner according to another embodiment of the invention.

Referring to FIG. 4, a structure similar to that of FIG. 3 is shown, the structure differing in that strips of tape 39 are utilized for securing together the flared flanges. The tape may be positioned over either the bottom or top of the flared flanges.

Figure 5:
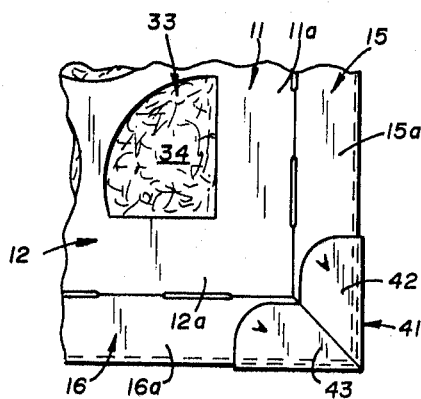
FIG. 5 is a fragmentary corner plan view showing a further structure and method of securing the corner of the filter frame.

FIG. 5 illustrates a filter structure similar to that of FIGS. 3 and 4, but where metal or plastic clips 41 are utilized to secure the flared corner, the clips 41 having clip wings 42 and 43 with bent-over portions on the opposite sides of the frame members engaging the flared flanges and maintaining them in flared position.

Figure 8:
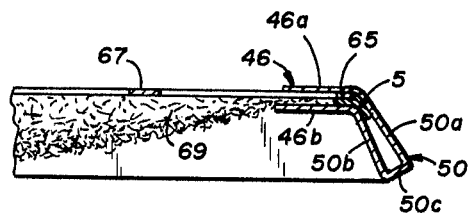
FIG. 8 is a fragmentary cross-sectional view taken at the line 8—8 of FIG. 6.
Figure 6:
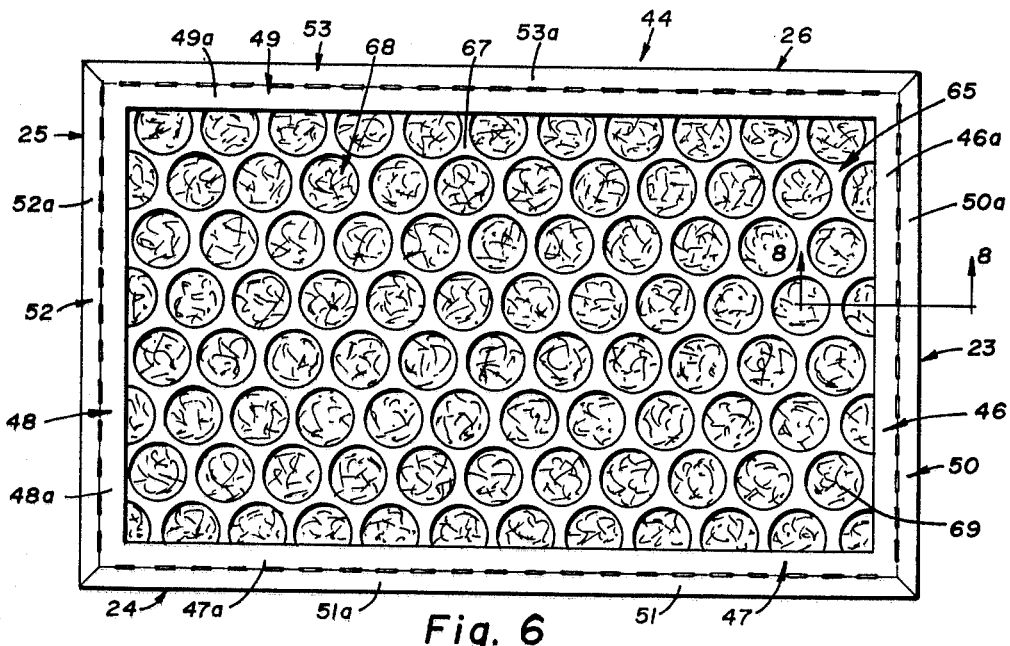
FIG. 6 is a plan view of a completed filter utilizing a backing formed of bottle cap scrap but otherwise utilizing tubular flared flanges according to the invention.
Figure 7:
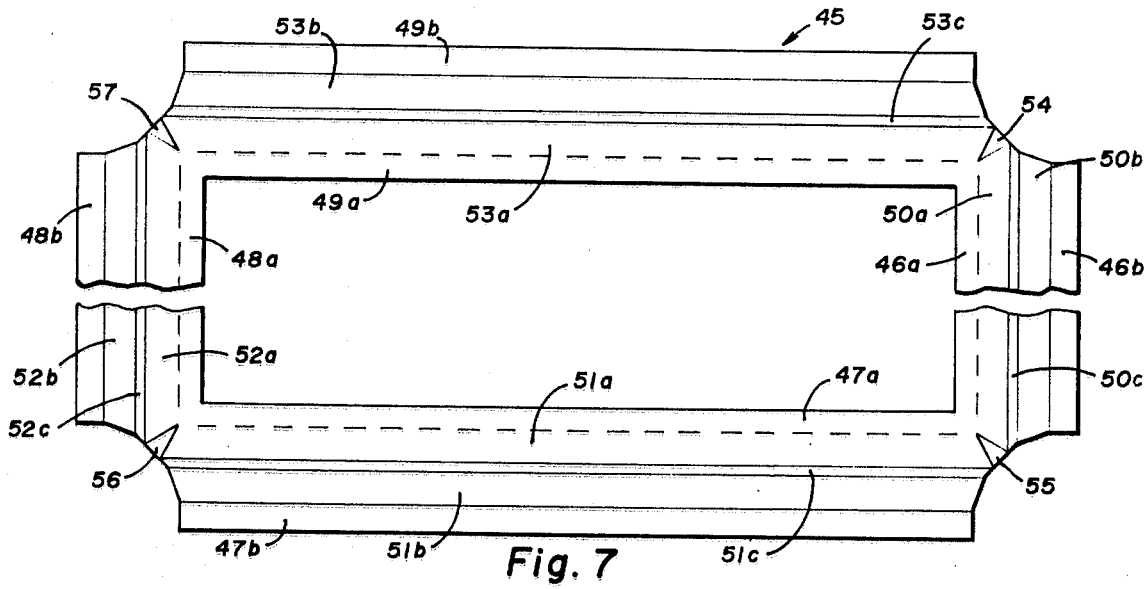
FIG. 7 is a plan view of an integral suitably cut and scored paperboard blank for making a frame utilized in the filter of FIG. 6.

Referring to FIGS. 6–8, an air filter 44 is shown which constitutes another embodiment of the invention. The frame is formed of a suitably cut and scored integral paperboard blank 45 comprising frame members 23, 24, 25 and 26 having coplanar flanges 46, 47, 48 and 49, and flared flanges 50, 51, 52 and 53. The coplanar flanges 46–49 are formed of bottom coplanar flange members 46a, 47a, 48a and 49a and top coplanar flange members 46b, 47b, 48b and 49b, respectively.

The flared flanges 50–53 are formed of bottom flared flange members 50a, 51a, 52a and 53a, top flared flange members 50b, 51b, 52b and 53b, and edge panels 50c, 51c, 52c and 53c, respectively, the edge panels being disposed intermediate and hingedly connected at its edges to the bottom and top flared flange members, thereby providing a tubular shape for the flared flanges.

The bottom flared flange members 50a–53a are hingedly connected along their other edges to the bottom coplanar flange members 46a–49a, and the top coplanar flange members 46b–49b are hingedly connected along their edges to the other edges of the top flared flange members 50b–53b, respectively. Tabs 54, 55, 56 and 57 are hingedly connected to the ends of some of the flared flange members and inserted between and adhesively affixed to adjacent flared flange members to affix the flared portion of the frame in position, as described above in connection with FIGS. 1–3. In this embodiment also, the bottom flared flange members 50a–53a, and the top flared flange members 50b–53b, respectively, converge toward each other in a direction away from their connections with the edge panels 50c–53c, respectively, to form a tubular structure of triangular or trapezoidal cross-section.

Since in the embodiment shown in FIGS. 6–8 no integral backing member is provided in the filter frame, during assembly of the filter a backing sheet 65 formed of conventional bottle cap scrap having webs 67 and apertures 68 may be inserted over the bottom coplanar flange members. A filter element 69 of glass fibers is then placed over the backing sheet 65. The top flared flange members and the top coplanar flange members are then folded over and the coplanar flanges are affixed to the backing sheet and filter element by an adhesive 65 or mechanical means. The corners of the flared flanges are affixed together by the tabs 54–57, as shown and described in conjunction with the description of FIGS. 1–3, or alternatively, by means of tape or clips as described above in conjunction with FIGS. 4 and 5.

The air filter of the present invention may be fabricated from any of a large number of materials. The preferred material for the frame is paperboard, although other materials may be utilized. Among such materials are jute board, thin pressed board and the like including coverings of plastic sheet and stiffer fabrics, in which are placed scores and perforation to form the hinge lines. Because of the structure of the frame having a coplanar portion formed of a double thickness and having tubular flared flanges, the filter frame has considerable strength and rigidity. For further reinforcement, a scrim of heavy strands of plastic material or twisted strands or bunches of any common plastic material, or even strands formed of glass fibers may be utilized on the top or influent side of the filter. Additionally, glass fiber mats having a greater density on the influent surface may be utilized. Since the bottom or effluent surface is provided with a backing or support member, no additional support need be utilized.

The filter mat preferably is formed of a core of glass fibers bound together by small particles of a resinous binder and coated with a thin transparent film of a viscous nonvolatile oil. Other suitable filter-forming materials may be utilized such as mineral wool fibers, quartz fibers, graphite fibers, horse hair, synthetic fibers such as polyester fibers or open cellular plastic foams.

The adhesive utilized for fastening the corners of the filter frame by means of the tabs 19–22 and 54–57, and for fastening the frame to the filter mat, and to the scrim if such is utilized, may be any of those well-known in the art. Generally slow-setting permanent adhesives, whether water based or solvent based, or adhesives comprising 100% solids, that have the capability of permanently bonding both similar and dissimilar surfaces by surface attachment exerting strong adhesive-holding force without substantial cold creep or dimensional change with time and under load, and which set to develop a long lasting, high, dry bond strength may be utilized. Among such adhesives are casein, natural resin, natural rubber, synthetic rubber, synthetic resin such as polyvinyl acetate, hot melts, pressure-sensitive adhesives, and other related materials may be utilized. Hot melt adhesives are especially advantageous. Alternatively, the portions of the frame may be mechanically bonded by means such as staples, rivets, or other fasteners.

As used herein the term "bottom" utilized in describing one side of the filter means the effluent, leeward, downwind, or downstream side. The "top" as similarly used herein means the influent, windward, upwind or upstream side.

The filter of the present invention has many advantages over prior art filters. First, the tubular frame is strong and rigid and can stand up over extended periods of use. Second, the presence of a flared portion of the frame permits adjacent filters in a package to nest within each other and to utilize only a fraction of the space normally utilized by rectangularly cross-sectioned filters. The presence of the edge panel or the tubular shape of the flared flanges does not interfere with the nesting ability of the filters. The frame for the filter may be formed from an integral cut and scored paperboard blank, resulting in a saving in both materials and assembly costs. In one embodiment an integral bottom backing member is utilized, thereby obviating the need for using bottle cap scrap which is presently in very short supply. The upstream surface of the filter mat may be made more dense than the remainder thereof in order to add physical strength to the mat and to obviate the need for an upstream backing member or a scrim. Moreover, when such structure is utilized, the mat itself may have a thickness greater than the usual one-inch mat, and the additional thickness is protected by the flared portion of the frame, and is compressed when the filters are nested in shipment.

While only several forms and embodiments of the invention have been shown and described, other forms and embodiments within the spirit and scope of the invention will become apparent to those skilled in the art. Therefore, the forms and embodiments shown in the drawings are to be considered as merely setting forth the invention for illustrative purposes and are not intended to limit the scope of the invention herein described and shown.

We claim:

1. A compact nestable air filter having a top surface and a bottom surface comprising:
   A. a generally rectangular frame formed of an integral suitably cut and scored blank comprising a plurality of interconnected frame members each comprising:
      1. a coplanar flange having bottom and top coplanar flange members in juxtaposition, and
      2. a flared flange disposed at an angle of less than 180° with respect to said coplanar flange and comprising bottom and top flared flange members both of which are disposed on the same side as and at an angle of less than 180° with respect to said coplanar flange, and an edge panel having one edge thereof integrally connected to an edge of said bottom flared flange member and the other edge thereof integrally connected to an edge of said top flared flange member, in said frame, said bottom flared flange members being hingedly connected to said bottom coplanar flange members, and said top coplanar flange members being hingedly connected to said top flared flange members, said flared flange members and said edge panels cooperating to define flanges of tubular cross-section in which the upper flared flange member and the lower flared member converge toward each other in a direction away from the edge panel to which they are connected and means securing the edges of the bottom and top flared flange members which are opposite to those which are connected to the edge panel so that said secured edges are fixed with respect to each other,

- B. means connecting the ends of adjacent flared flanges together,
- C. a perforated bottom cover, and
- D. a filter member retained by said coplanar flanges.

2. An air filter according to claim 1, wherein said perforated bottom cover (C) is formed of metal bottle cap scrap.

3. An air filter according to claim 1, wherein said perforated bottom cover (C) constitutes a portion of said integral blank, and is an integral continuation of the material which defines said bottom coplanar flange members.

4. An air filter according to claim 3, wherein said means connecting the ends of adjacent flared flanges together comprises a tab provided on a flared flange member at each corner of said frame affixed to the adjacent flared flange.

5. An air filter according to claim 4, wherein said tabs are affixed to the outer surfaces of adjacent flared flanges.

6. An air filter according to claim 4, wherein said tabs are adhesively affixed intermediate the flared flange members of adjacent flared flanges.

7. An air filter according to claim 3, wherein said means connecting the ends of adjacent flared flanges together are strips of tape adhesively affixed thereto.

8. An air filter according to claim 3, wherein said means connecting the ends of adjacent flared flanges together are clips having means affixed to said adjacent flared flanges.

9. An air filter according to claim 3, wherein said filter member is denser at the upstream surface thereof, thereby strengthening said surface.

* * * * *